United States Patent
Mahonen et al.

(10) Patent No.: US 10,589,289 B2
(45) Date of Patent: Mar. 17, 2020

(54) METHOD FOR CONTROLLING THE OPERATION OF A CRUSHER, A MINERAL MATERIAL PROCESSING PLANT AND A CONTROL SYSTEM

(71) Applicant: Metso Minerals, Inc., Helsinki (FI)

(72) Inventors: Jouni Mahonen, Tampere (FI); Jouni Rahkomaa, Tampere (FI); Marko Salonen, Tampere (FI)

(73) Assignee: Metso Minerals, Inc., Helsinki (FI)

( * ) Notice: Subject to any disclaimer, the term of this patent is extended or adjusted under 35 U.S.C. 154(b) by 235 days.

(21) Appl. No.: 15/121,223

(22) PCT Filed: Mar. 18, 2014

(86) PCT No.: PCT/FI2014/050199
§ 371 (c)(1),
(2) Date: Aug. 24, 2016

(87) PCT Pub. No.: WO2015/140387
PCT Pub. Date: Sep. 24, 2015

(65) Prior Publication Data
US 2017/0014833 A1    Jan. 19, 2017

(51) Int. Cl.
*B02C 25/00* (2006.01)
*G05B 19/042* (2006.01)

(52) U.S. Cl.
CPC .......... *B02C 25/00* (2013.01); *G05B 19/0428* (2013.01); *G05B 2219/40377* (2013.01)

(58) Field of Classification Search
None
See application file for complete search history.

(56) References Cited

U.S. PATENT DOCUMENTS

| | | | |
|---|---|---|---|
| 2010/0230519 A1* | 9/2010 | Torres | B02C 2/047 241/25 |
| 2011/0077821 A1* | 3/2011 | Yamaguchi | B02C 21/026 701/36 |

FOREIGN PATENT DOCUMENTS

| | | |
|---|---|---|
| CN | 1747786 A | 3/2006 |
| CN | 101945707 A | 1/2011 |
| CN | 102348508 A | 2/2012 |
| DE | 19747628 | 5/1999 |
| DE | 19747628 A1 | 5/1999 |

(Continued)

OTHER PUBLICATIONS

International Search Report and Written Opinion for International Application No. PCT/FI2015/050199 dated Dec. 9, 2014.

(Continued)

*Primary Examiner* — Eric C Wai
(74) *Attorney, Agent, or Firm* — Andrus Intellectual Property Law, LLP (57) ABSTRACT

A method for controlling the operation of a crusher, a mineral material processing plant and a control system. The method including measuring a quantity related to stress to which the crusher is exposed during the crushing of material, determining a deviation value of the quantity related to stress, comparing the determined deviation value to a reference deviation value, and in response to the deviation value differing from the reference deviation value, adjusting a default setting of the quantity related to stress.

14 Claims, 5 Drawing Sheets

(56) References Cited

FOREIGN PATENT DOCUMENTS

WO   2005007293        1/2005
WO   2009145033 A1    10/2011

OTHER PUBLICATIONS

International Preliminary Report on Patentability for International Application No. PCT/FI2015/050199 dated Apr. 26, 2016.
Office Action and Search Report for Chinese Patent Application No. 2014800772255 dated Mar. 20, 2018.

* cited by examiner

METHOD FOR CONTROLLING THE OPERATION OF A CRUSHER, A MINERAL MATERIAL PROCESSING PLANT AND A CONTROL SYSTEM

CROSS-REFERENCE TO RELATED APPLICATIONS

This application claims priority to PCT/FI2014/050199, filed Mar. 18, 2014, and published in English on Sep. 24, 2015 as publication number WO 2015/140387, incorporated herein by reference.

FIELD OF INVENTION

The invention relates to a method for controlling the operation of a crusher and to a mineral material processing plant.

BACKGROUND OF THE INVENTION

Mineral material, such as stone, is retrieved to be crushed from the ground either by exploding or by digging. The mineral material may also comprise natural stone, gravel and construction waste. Both mobile crushers and fixed crusher applications are used for crushing. The material to be crushed is fed with an excavator or a wheel loader into a feed hopper of the crusher, from where the material to be crushed falls into the jaws of the crusher, or a feeder or a feeder device transfers the stone material towards the crusher.

A mineral material processing plant comprises one or more crushers and/or screens and possibly further devices such as conveyors. The processing plant may be fixed or mobile. In particular mobile processing plants are used in urban surroundings in processing recyclable material such as construction waste.

Preferably a mineral material processing plant is operated with full capacity, i.e. the amount of mineral material processed is kept as high as possible but within safety and other limits of the equipment used. This requires that the process parameters, such as the homogeneity and type of material to be crushed are suitable. Typically a crusher has an upper limit for a value, such as pressure, representing the load and stresses in the crushing chamber.

From patent publication U.S. Pat. No. 8,540,175 a method is known in which a stress reference value is set. A statistical value representing peak stress is calculated from average stress and standard deviation thereof. If this value exceeds the stress reference value, the crusher is controlled in order to reduce the stress and vice versa. In other words, a "safety margin" calculated from standard deviation is added to average stress value, and the resulting value is kept under the stress limit.

The above method shows little consideration for the effect of the stress profile on the crushing process, but merely considers a statistical peak value that has to be kept under a limit. Accordingly, an objective of the invention is to provide a method for controlling a mineral material processing plant that considers the stress profile on a given operating situation and provides efficient usage of the full capacity of the processing plant.

SUMMARY

According to a first aspect of the invention there is provided a method for controlling the operation of a crusher, wherein the method comprises measuring a quantity related to stress to which the crusher is exposed during the crushing of material;

determining a deviation value of the quantity related to stress; comparing the determined deviation value to a reference deviation value; and in response to the deviation value differing from the reference deviation value, adjusting a default setting of the quantity related to stress.

The method may further comprise prior to measuring the quantity related to stress, predetermining a default setting and an upper limit for the quantity related to stress to which the crusher is exposed during the crushing of material and an initial reference deviation value.

The reference deviation value may comprise the initial reference deviation value and/or a previously determined deviation value.

Adjusting the default setting may carried out by subtracting the deviation value multiplied by a constant from an upper limit of the quantity related to stress to which the crusher is exposed during the crushing of material.

Comparing the determined deviation value to the reference deviation value may comprise first adding a predetermined amount to the deviation value.

The deviation value may comprise standard deviation.

The method may further comprise adjusting the default setting of the quantity related to stress in response to a trigger from a control system.

The quantity related to stress to which the crusher is exposed during the crushing of material may comprise pressure, tension, load, power, torque or vibration.

The crusher may comprise a gyratory crusher, a cone, a jaw crusher, a high press roll (HRC) crusher, a vertical shaft impactor (VSI) crusher or a horizontal shaft impactor (HSI) crusher.

According to a second aspect of the invention there is provided a mineral material processing plant comprising
 a crusher; and
 a control system configured to control the mineral material processing plant according to a method of first aspect of the invention.

The crusher may comprise a gyratory crusher, a cone crusher, a jaw crusher, a high press roll (HRC) crusher, a vertical shaft impactor (VSI) crusher or a horizontal shaft impactor (HSI) crusher.

The mineral material processing plant may comprise a mobile plant.

According to a third aspect of the invention there is provided control system for controlling the operation of a crusher, wherein said control system is configured to control the system according to a method of the first aspect of the invention.

According to a fourth aspect of the invention there is provided a computer program comprising computer executable program code that when executed causes a computer to execute a method according to the first aspect of the invention.

Different embodiments of the present invention will be illustrated or have been illustrated only in connection with some aspects of the invention. A skilled person appreciates that any embodiment of an aspect of the invention may apply to the same aspect of the invention and other aspects

BRIEF DESCRIPTION OF THE DRAWINGS

The invention will now be described, by way of example, with reference to the accompanying drawings, in which.

DETAILED DESCRIPTION

In the following description, like numbers denote like elements. It should be appreciated that the illustrated figures are not entirely in scale, and that the figures mainly serve the purpose of illustrating embodiments of the invention.

Figure 1:
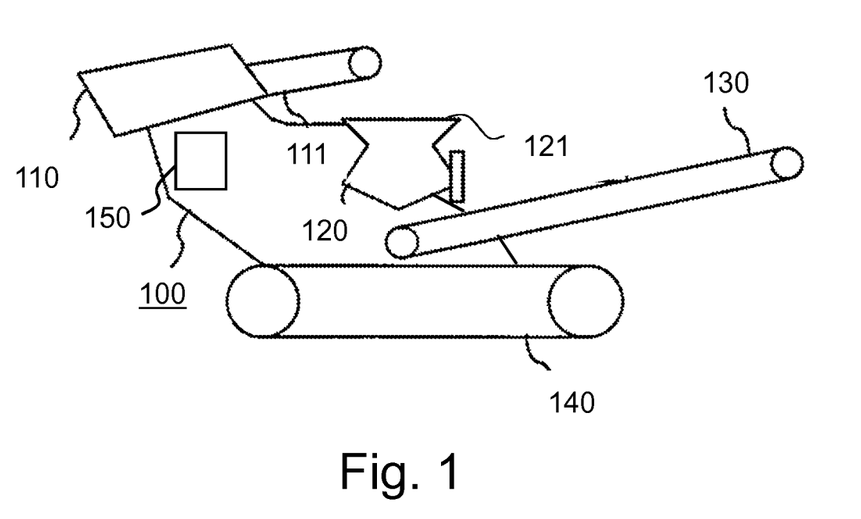
FIG. 1 shows a schematic side view of a mineral material processing plant according to an embodiment of the invention.

FIG. 1 shows a mineral material processing plant 100 according to an example embodiment. The mineral material processing plant 100 comprises in an embodiment a gyratory or cone crusher 120. In a further example embodiment the mineral material processing plant comprises a jaw crusher, a high press roll (HRC) crusher, a vertical shaft impactor (VSI) crusher or a horizontal shaft impactor (HSI) crusher. The crusher can be used as a primary crusher, or for example as an intermediate or secondary crusher, furthermore the crusher can be used in fine crushing. The mineral material processing plant 100 further comprises a feeder 110 and conveyors 111,130. The mineral material processing plant according to an example embodiment is a mobile mineral material processing plant and comprises for example a track base 140. In a further example embodiment, the mineral material processing plant is a fixed plant. Furthermore, the mineral material processing plant 100 comprises a control unit, or control system, 150 configured to control the crushing process in accordance with a method according to an embodiment of the invention. A skilled person appreciates that the control unit 150 may be integrated with the mineral material processing plant or reside separate therefrom, for example integrated with a wider automation system. Furthermore, a skilled person appreciates that the mineral material processing plant may comprise other parts and/or units not shown in FIG. 1, such as a motor and hydraulic circuits, and/or that some parts shown in FIG. 1 may not be present.

Figure 2:
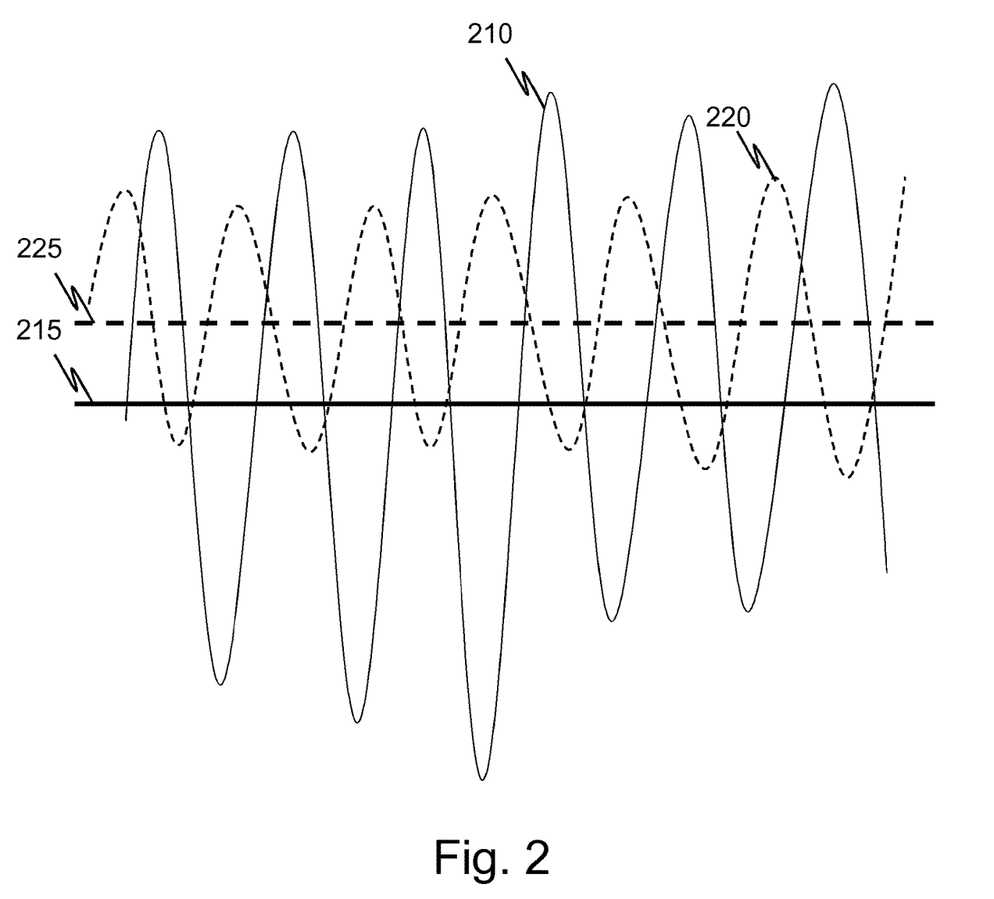
FIG. 2 shows a graph of stress values of a crusher in two different operating situations.

FIG. 2 shows a graph of stress values of a crusher in two different operating situations. The vertical axis of the graph shows the value of a quantity related to the stress to which the crusher is exposed during the crushing of material. In an example embodiment, the quantity related to the stress to which the crusher is exposed during the crushing of material comprises any quantity that fluctuates and for which a deviation value, such as standard deviation, variance or a similar quantity known to a person skilled in the art, can be calculated. In an embodiment the quantity comprises for example load, tension, such as tension force in the frame of a crusher that can be measured by a strain gauge or power cell sensors, crushing force, power such as electrical or average rms power, torque, vibration such as resonance frequency of a crusher, or pressure, such as pressure in the setting adjustment circuit of the crusher. The measured quantity, e.g. load, power or torque, is in an embodiment chosen in accordance with the power source, such as electric motor, hydraulic motor or diesel motor, in use. The horizontal axis of the graph shows time. In a first operating situation 210, the stress fluctuates and has an average value 215. The fluctuation of the stress can relate to several factors, for example heterogeneity of the material to be crushed, presence of uncrushable material or uneven wear of crusher wear surfaces. In a second operating situation 220, the stress fluctuates less, for example due to homogenous material being crushed. However, in the operating situation 220, the average value 225 of the stress is higher.

Figure 3:
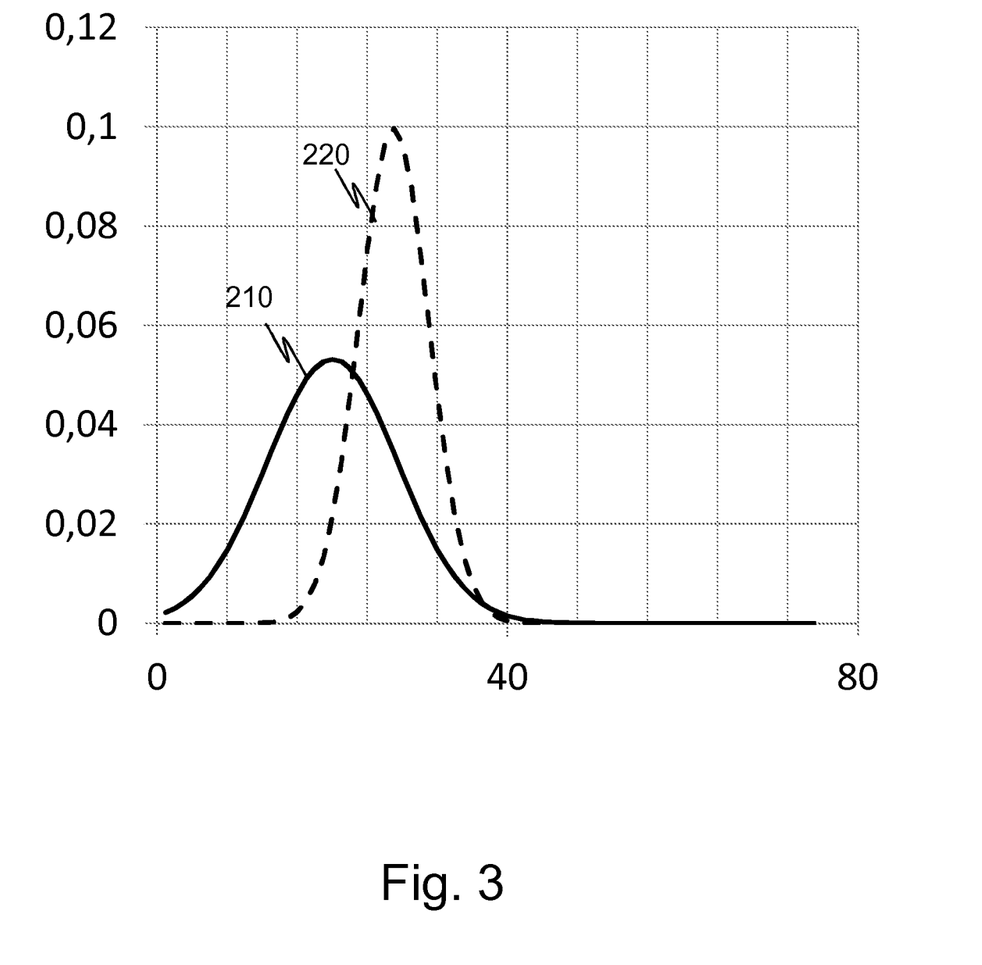
FIG. 3 shows a graph of distribution of stress values of a crusher in two different operating situations.
Figure 4:
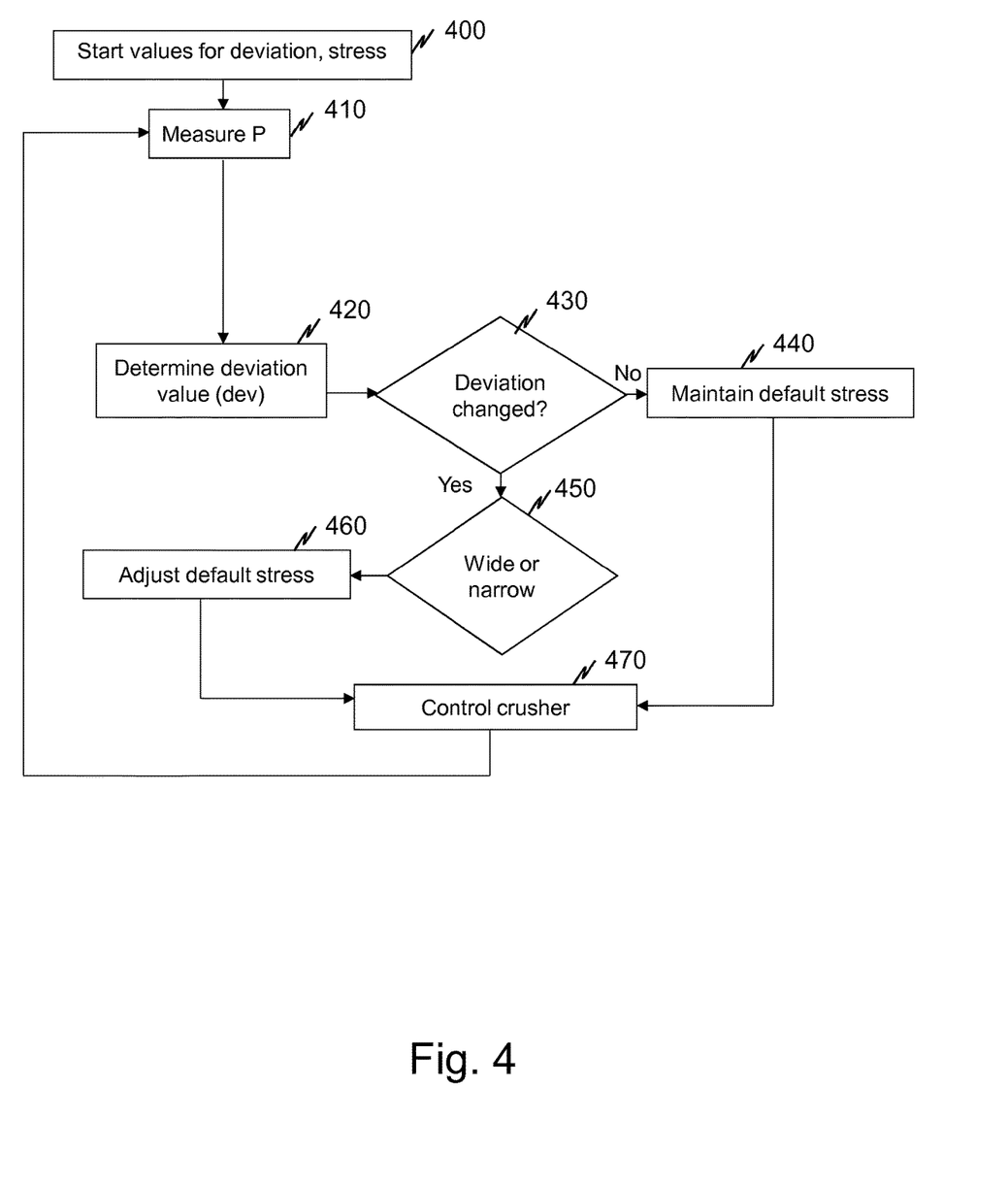
FIG. 4 shows a flow chart of a method according to an embodiment of the invention.

FIG. 3 shows a graph of distribution of stress values of a crusher in two different operating situations, i.e. the situations 210 and 220 shown in FIG. 2. The vertical axis of the graph shows the probability density and the horizontal axis of the graph shows the stress value, in this case pressure in bar. Despite the higher average value, the second operating situation 220 is less taxing to the crusher, for example less wearing to the parts thereof, and accordingly preferable, as the crusher may be operated with a higher capacity. Several aspects affect the deviation of the stress during the operation of the crusher, for example properties of the material to be crushed, such as uneven crushability, moisture content, particle size distribution and segregation of the material in the crushing chamber; feed capacity; material level in the feeding system of the crusher; wear, or uneven wear, of the crushing blades; and uncrushable material contained in the material to be crushed, such as tramp iron;

FIG. 4 shows a flow chart of a method according to an embodiment of the invention.

At step 400 an initial or start stress values are set. Again, it is noted that the quantity related to stress to which the crusher is exposed during the crushing of material comprises, as hereinbefore described for example pressure, force or load, but hereinafter reference is made to pressure. These initial stress related values comprise a high pressure limit Plimit, i.e. a pressure not to be exceeded, and a default high pressure Phigh, i.e. a pressure setting or target value with which the crusher is operated. A skilled person appreciates that the default high pressure Phigh is used as a setting in the control unit and the crusher is controlled in a conventional manner so that the operating pressure P corresponds to the default high pressure Phigh. Furthermore, the initial stress values, in an embodiment comprise also a maximum stress Pmax that is higher than the default high pressure and a still higher excessive stress value Pexc. These values are used as safety limits in the control of the crusher in a conventional manner, for example if the value Pmax is exceeded, the feeder of the crusher is stopped and the whole crusher is stopped if the value Pexc is exceeded. At step 400 also an initial reference deviation value dev_ini is set, based e.g. on history data or an assumption as to the operation of the crusher.

In a further embodiment, the crushing process is operated for a certain time prior to setting the initial values in order to receive a sufficient amount of data for determining the characteristics of the operation situation at hand. In an embodiment, all or some initial values are reset during the operation of the crusher in accordance with the situation.

Figure 5A:
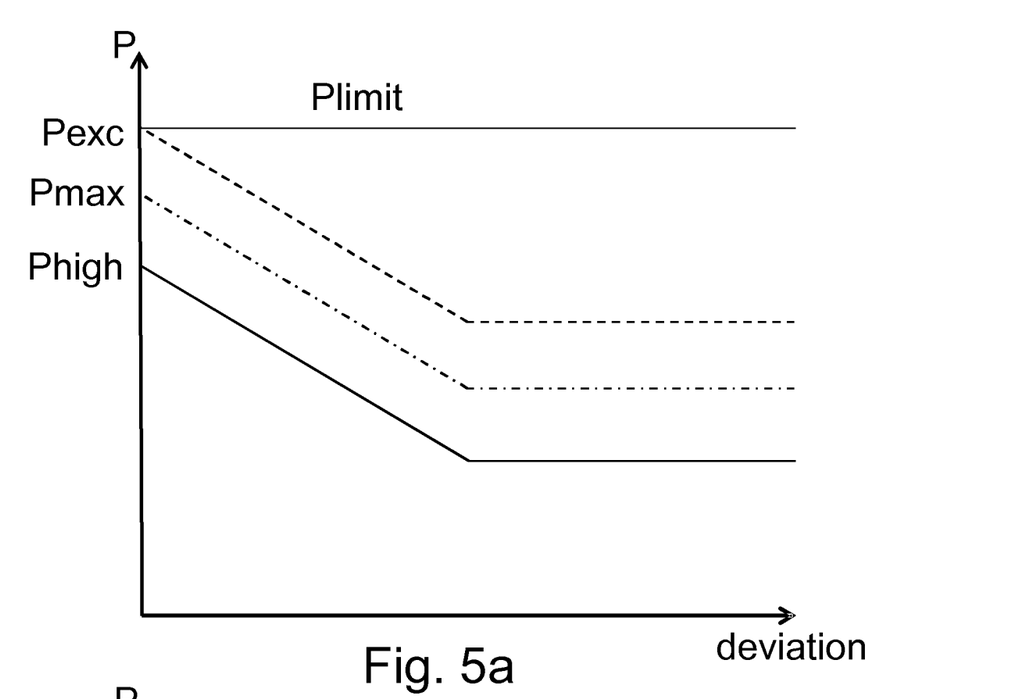
FIG. 5a shows a graph showing the values of the quantity related to the stress of the crusher according to an embodiment of the invention.
Figure 5B:
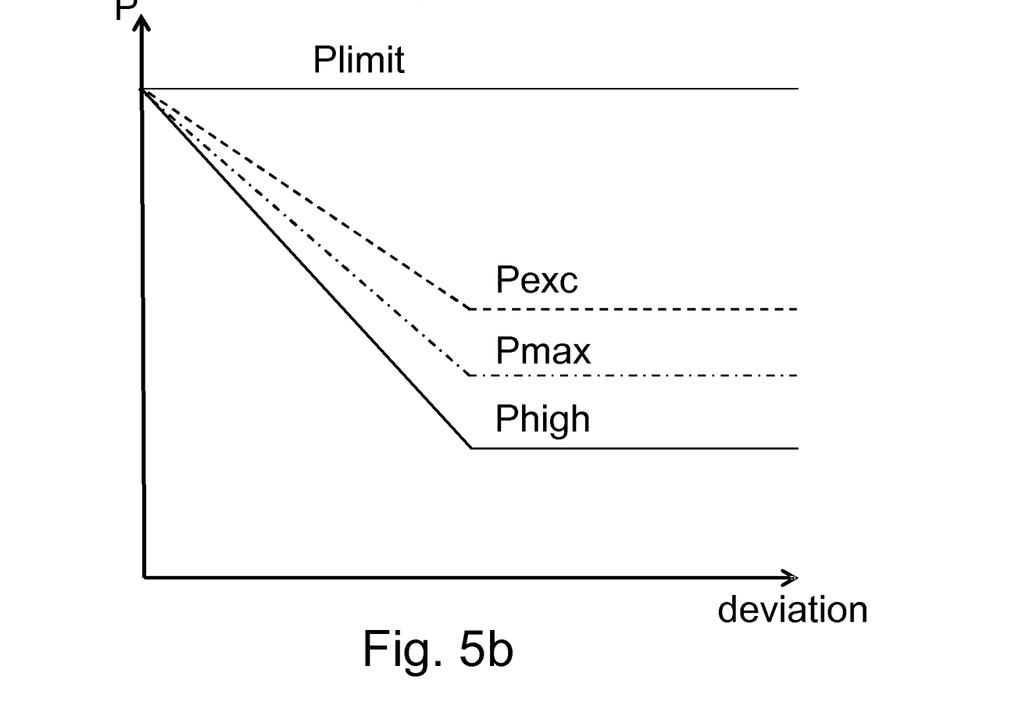
FIG. 5b shows a graph showing the values of the quantity related to the stress of the crusher according to an embodiment of the invention.

The values of Phigh, Pmax and Pexc are shown in FIGS. 5a and 5b. As seen from FIGS. 5a and 5b, the value of Pmax and Pexc is in an embodiment also changed depending on the deviation value, such as standard deviation, as hereinafter described with reference to FIG. 4 and the default high stress Phigh. As shown in FIG. 5b, according to an embodiment, the values of Phigh, Pmax and Pexc are scaled with a proper constant so that as the deviation value, such as standard deviation, approaches zero, the values Phigh, Pmax and Pexc are able to be closer to each other, and accordingly all values approach the high limit Plimit. Also the initial reference deviation value may be scaled in a similar manner.

At step 410 the stress of the crusher, for example the pressure in the crushing chamber, is measured. In order to later calculate a deviation value, such as standard deviation, of the stress, samples are collected for a certain period of time with a certain sampling frequency. The measurement is carried out in a conventional manner with conventional sensors, data processing and connections to the control system. A skilled person appreciates that the measurement of the stress in an embodiment comprises sampling of momentary values and/or sampling of average values that have for example been averaged with a certain filter or time window with common procedures in measurement technology.

At step 420, a deviation value dev, such as standard deviation, of the previously measured stress is determined. This determination is carried out in conventional manner in the control system, i.e. in the control unit.

At step 430 the deviation value dev, such as standard deviation, is compared to a reference deviation value dev_ref. In an embodiment the deviation value is compared to the initial reference deviation value dev_ini, i.e. it is determined whether the deviation value differs from the predetermined initial reference deviation value dev_ini. In a further embodiment, a previous determination of the deviation value is used as the reference deviation value dev_ref, i.e. it is determined whether the deviation value dev, such as standard deviation, has changed from the previous determination thereof. In an embodiment, the deviation value needs to differ with a predetermined amount from the reference deviation value dev_ref before the change is recognized as such, i.e. a predetermined amount is added to the deviation value dev prior to the comparison. In a further example embodiment, the deviation value is compared to both the initial reference deviation value dev_ini and a previously determined deviation value, and in an example embodiment, if the deviation value is found to differ either from one of them or from both of them, the change is recognized.

In response to the deviation value not having changed, the default high pressure Phigh is not changed and the operation of the crusher, i.e. control of the stress to the default high pressure Phigh is carried on in conventional manner at step 470, i.e. the control seeks to keep the average stress at the default high pressure Phigh.

In response to the deviation value having changed, the deviation value determined at step 420 is compared to a predetermined value or values in order to determine whether the distribution of the stress values is narrow or wide at step 450. The predetermined value to which the deviation value is compared is predetermined based on the situation at hand and depends for example on the type of crusher and/or on the accepted amount of stress values exceeding the high stress limit Plimit.

In response to the distribution being narrow, i.e. the deviation value being lower than the predetermined value, at step 460 the value of the default high pressure Phigh is increased. The increase is possible due to the fact that an operating situation with less fluctuating stress is friendlier to the crusher and accordingly the default high pressure Phigh that is used as the setting for crusher control can be closer to the high pressure limit Plimit. In response to the distribution being wide, i.e. the deviation value being higher than the predetermined value, at step 460 the value of the default high pressure Phigh is decreased. In an embodiment, the default high pressure Phigh is determined by subtracting the deviation value multiplied by a constant from the high pressure limit Plimit, i.e. with the formula Phigh=Plimit−A*dev, wherein A is a constant chosen based on e.g. the type of the crusher and the operating situation. In an example embodiment the constant A has a value of 1,96 and the deviation value is the standard deviation.

In a further example embodiment, the default high pressure is adjusted in response to the control unit detecting an imbalance or a further type of fluctuation in the stress levels, even if the deviation value had not changed. For example, if the control unit comprises a system for measuring the stress on different parts of the crushing chamber, a detected imbalance therein is used to trigger the adjustment of the default high pressure Phigh.

A skilled person appreciates, that several quantities related to the stress of the crusher are measured concurrently and the method according to the invention is applied to one or several quantities. Accordingly, even if the deviation value of a certain quantity remains unchanged, the change in the deviation value of a further quantity may cause an adjustment of the default high value of the stress as hereinbefore described.

In a further example embodiment, if the deviation value is found to be exceptionally high or low at step 450, for example if the deviation is higher than the initial reference deviation value dev_ini or higher or lower than a further predetermined value, an adjustment of the setting of the crusher, i.e. the crushing chamber setting, is in an embodiment carried out. Generally, if the deviation value is low or high, a lower or higher setting of the crusher, respectively, is often sought after, for example in order to improve the efficiency of the crushing process or in order to reduce the deviation value. Often a certain setting of the crusher is desired, but in some situations this desired setting may cause an unacceptable, i.e. a too high or low deviation value, and accordingly, a setting with an acceptable deviation value close to the desired setting is sought after. In an embodiment, the setting of the crusher is varied around the desired setting, for example by choosing a number of lower settings and a number of higher settings and ramping the crusher through these setting values in such a way that the crusher is driven with each setting for a given period of time, such as 10 seconds, and the deviation value for each setting is determined. Based on the determination of the deviation value for each setting, a setting that is close to the desired setting and has an acceptable deviation value, for example a deviation value lower than the initial reference deviation value dev_ini, is chosen from the group of settings that were tested.

A few examples of a situation wherein the above test of crusher setting values is used is given in the following. The crusher is driven with a setting of 20 mm and it is determined that the deviation value is decreasing, for example due to an unsuitable jaw angle, meaning that the crusher is not efficiently processing the material to be crushed, and the power level either remains the same or decreases. Generally, in such a situation a decrease of the setting would increase the deviation value, but in this case, the deviation would continue to decrease due to the jaw angle becoming even more unsuitable. Accordingly, the test for a more appropriate setting as hereinbefore described is carried out with setting values on both sides of 20 mm in order to resolve the situation. Similarly, if the crusher is driven with a setting of 20 mm and the deviation value increases, this would generally point to a need for increasing the setting. However, a higher setting does not necessarily decrease the deviation value, and accordingly, the test for a more appropriate setting as hereinbefore described is carried out with setting values on both sides of 20 mm in order to find the most appropriate setting.

In an embodiment, the aforementioned test for a crusher setting with an acceptable deviation value is carried out each time the deviation value is found to be exceptionally high or low. In a further embodiment, the aforementioned test for a setting with an acceptable deviation value is carried out in the beginning of the operation of the crusher and/or periodically during operation of the crusher.

After the default high pressure Phigh has been adjusted, control of operation of the crusher, i.e. control of the stress to the default high pressure Phigh, is carried on in conventional manner at step 470, i.e. the control seeks to keep the average stress at the default high pressure Phigh. The control of the crusher is carried out in conventional manner, depending on the type of the crusher, for example by adjusting the setting of the crusher or the rotating speed of the crusher.

Without in any way limiting the scope of protection, interpretation or possible applications of the invention, a technical advantage of different embodiments of the invention may be considered to be an increased capacity of the crusher. Further, a technical advantage of different embodiments of the invention may be considered to be safer operation of the crusher at high capacity. Further, a technical advantage of different embodiments of the invention may be considered to be a longer lifetime of crusher parts.

The foregoing description provides non-limiting examples of some embodiments of the invention. It is clear to a person skilled in the art that the invention is not restricted to details presented, but that the invention can be implemented in other equivalent means. Some of the features of the above-disclosed embodiments may be used to advantage without the use of other features.

As such, the foregoing description shall be considered as merely illustrative of the principles of the invention, and not in limitation thereof. Hence, the scope of the invention is only restricted by the appended patent claims.

The invention claimed is:

1. A method for controlling the operation of a crusher, wherein the method comprises:
    measuring a quantity related to stress to which the crusher is exposed during the crushing of material;
    determining a deviation value of the quantity related to stress;
    comparing the determined deviation value to a reference deviation value;
    in response to the determined deviation value differing from the reference deviation value, adjusting at least one default setting of the quantity related to stress, wherein adjusting the at least one default setting comprises increasing the default setting if the determined deviation value is lower than the reference deviation value and decreasing the default setting if the determined deviation value is higher than the reference deviation value; and
    operating the crusher utilizing the adjusted default setting as a target value in control of the quantity related to stress to increase an efficiency of the crusher.

2. The method according to claim 1, wherein the method further comprises prior to measuring the quantity related to stress, predetermining a default setting and an upper limit for the quantity related to stress to which the crusher is exposed during the crushing of material and an initial reference deviation value.

3. The method according to claim 1, wherein the reference deviation value comprises the initial reference deviation value and/or a previously determined deviation value.

4. The method according to claim 1, wherein adjusting the default setting is carried out by subtracting the deviation value from an upper limit of the quantity related to stress to which the crusher is exposed during the crushing of material.

5. The method according to claim 1, wherein comparing the determined deviation value to the reference deviation value comprises first adding a predetermined amount to the deviation value.

6. The method according to claim 1, wherein the deviation value comprises standard deviation.

7. The method according to claim 1, further comprising adjusting the default setting of the quantity related to stress in response to a trigger from a control system.

8. The method according to claim 1, wherein the quantity related to stress to which the crusher is exposed during the crushing of material comprises pressure, tension, load, power, torque or vibration.

9. The method according to claim 1, wherein the crusher is selected from a group consisting of a gyratory crusher, a cone crusher, a jaw crusher, a high press roll (HRC) crusher, a vertical shaft impactor (VSI) crusher and a horizontal shaft impactor (HSI) crusher.

10. A mineral material processing plant comprising:
    a crusher; and
    a control system configured to control the mineral material processing plant according to the method of claim 1.

11. A mineral material processing plant according to claim 10, wherein the crusher is selected from a group consisting of a gyratory crusher, a cone, a jaw crusher, a high press roll (HRC) crusher, a vertical shaft impactor (VSI) crusher and a horizontal shaft impactor (HSI) crusher.

12. A mineral material processing plant according to claim 10, wherein the mineral material processing plant comprises a mobile plant.

13. A control system for controlling the operation of a crusher, wherein said control system is configured to control the system according to the method of claim 1.

14. A computer program fixed in a non-transient medium of expression comprising computer-executable program code, wherein when executed, the program code causes a computer to execute a method according to claim 1.

* * * * *